(12) United States Patent
Liang et al.

(10) Patent No.: US 8,718,331 B2
(45) Date of Patent: May 6, 2014

(54) IMAGE DETECTING APPARATUS AND METHOD THEREOF

(75) Inventors: Ren Kuan Liang, Hsinchu Hsien (TW); Yu-Chieh Hung, Hsinchu Hsien (TW); Meng-Che Tsai, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 258 days.

(21) Appl. No.: 12/844,953

(22) Filed: Jul. 28, 2010

(65) Prior Publication Data
US 2011/0026776 A1 Feb. 3, 2011

Related U.S. Application Data

(60) Provisional application No. 61/229,277, filed on Jul. 29, 2009.

(51) Int. Cl.
*G06K 9/00* (2006.01)

(52) U.S. Cl.
USPC .......................................................... 382/107

(58) Field of Classification Search
None
See application file for complete search history.

(56) References Cited

U.S. PATENT DOCUMENTS

| | | | | |
|---|---|---|---|---|
| 4,819,255 A * | 4/1989 | Sato | ................................. | 378/42 |
| 6,314,211 B1 * | 11/2001 | Kim et al. | ...................... | 382/285 |
| 6,411,326 B1 * | 6/2002 | Tabata | ............................. | 348/47 |
| 7,671,888 B2 * | 3/2010 | Nogami et al. | ................. | 348/45 |
| 7,817,106 B2 * | 10/2010 | Fukushima et al. | ............ | 345/32 |
| 8,134,591 B2 * | 3/2012 | Marcus et al. | .................. | 348/54 |
| 8,436,893 B2 * | 5/2013 | McNamer et al. | .............. | 348/50 |
| 8,441,520 B2 * | 5/2013 | Dahi et al. | ...................... | 348/47 |
| 8,477,425 B2 * | 7/2013 | Border et al. | ................. | 359/630 |
| 8,488,246 B2 * | 7/2013 | Border et al. | ................. | 359/630 |
| 2004/0135740 A1 * | 7/2004 | Sato et al. | ......................... | 345/6 |
| 2008/0247462 A1 * | 10/2008 | Demos | ..................... | 375/240.03 |
| 2009/0189830 A1 * | 7/2009 | Deering et al. | ................. | 345/1.3 |
| 2009/0278918 A1 * | 11/2009 | Marcus et al. | .................. | 348/54 |
| 2010/0149321 A1 * | 6/2010 | Ushiki et al. | ................... | 348/51 |
| 2010/0238267 A1 * | 9/2010 | Izzat et al. | ...................... | 348/43 |
| 2011/0199466 A1 * | 8/2011 | Kim et al. | ....................... | 348/55 |

OTHER PUBLICATIONS

Machine translation—JP 2008-315524 Ushika et al Dec. 11, 2008.*

* cited by examiner

*Primary Examiner* — Nancy Bitar
(74) *Attorney, Agent, or Firm* — Han IP Corporation

(57) ABSTRACT

A method for detecting left-eye/right-eye images is capable of effectively and accurately detecting a sequence or positions of left-eye/right-eye image frames of a stereo image signal. The method includes performing block matching on a target block corresponding to two consecutive image frames of an image signal to determine a motion vector; and performing left-eye/right-eye image determination on a current image frame from the two consecutive image frames according to the motion vector.

16 Claims, 6 Drawing Sheets

| | t1 | | t2 | | t3 | | t4 | | t5 | | t6 | | t7 | |
|---|---|---|---|---|---|---|---|---|---|---|---|---|---|---|
| | L | R | L | R | L | R | L | R | L | R | L | R | L | R |
| motion: | 1 |   | X | 1 |   | X | 1 |   | X | 1 |   | X | 1 |   |
| static: | 1 | 2 | 1 | 2 | 1 | 2 | 1 | 2 | 1 | 2 | 1 | 2 | 1 | 2 |

| | t1 | | t2 | | t3 | | t4 | | t5 | | t6 | | t7 | |
|---|---|---|---|---|---|---|---|---|---|---|---|---|---|---|
| | R | L | R | L | R | L | R | L | R | L | R | L | R | L |
| motion: | 2 |   | X | 2 |   | X | 2 |   | X | 2 |   | X | 2 |   |
| static: | 2 | 1 | 2 | 1 | 2 | 1 | 2 | 1 | 2 | 1 | 2 | 1 | 2 | 1 |

| | t1 | t2 | t3 | t4 | t5 | t6 | t7 | t8 | t9 | t10 | t11 | t12 |
|---|---|---|---|---|---|---|---|---|---|---|---|---|
| | L | R | L | R | L | R | L | R | L | R | L | R |
| motion: | X | X | X | X | X | X | X | X | X | X | X | X |
| static: | 1 | 2 | 1 | 2 | 1 | 2 | 1 | 2 | 1 | 2 | 1 | 2 | imagine # IMAGE DETECTING APPARATUS AND METHOD THEREOF

CROSS REFERENCE TO RELATED PATENT APPLICATIONS

This patent application claims priority from U.S. Provisional Patent Application No. 61/229,277, filed on Jul. 29, 2009, entitled "Apparatus for Detecting Left/Right Sequence in 3D Stereo Video", which is hereby incorporated in its entirety by reference.

TECHNICAL FIELD

The present disclosure relates to an image frame detecting mechanism, and more particularly, to an image frame detecting apparatus and a method thereof capable of performing left-eye/right-eye image determination.

BACKGROUND OF THE PRESENT DISCLOSURE

As the display technology develops and evolves, current display technology pursues to provide a three-dimensional (3D) stereo display with an optimal immersive effect. Most stereo image display technologies implement a concept that an image signal is divided into left-eye images and right-eye images having different visual angles. The left-eye images and the right-eye images are respectively transmitted to the left eye and the right eye of a viewer via a stereo image display, and are then projected into a stereo image in the human brain. Accordingly, the left-eye images and the right-eye images are interleaved with each other in a common stereo image signal. However, a sequence of the left-eye images and the right-eye images is not particularly designated in the common stereo image signal, i.e., positions of the left-eye images and the right-eye images are not designated. Therefore, in order to accurately transmit the left-eye images and right-eye images to the left eye and the right eye, respectively, it is crucial to first detect the sequence of the left-eye image and right-eye image of the stereo image.

SUMMARY OF THE PRESENT DISCLOSURE

Therefore, one object of the present disclosure is to provide an image detecting apparatus and a method thereof capable of detecting left-eye/right-eye image frames to effectively and accurately detect a sequence or positions of left-eye/right-eye image frames of a stereo image signal. In addition, the image detecting apparatus and the method thereof are also capable of detecting a dimension of a current image frame, i.e., whether the current image frame is a stereo image or a two-dimensional (2D) image can be determined.

According to an embodiment of the present disclosure, an image detecting method comprises performing block matching on a target area corresponding to two consecutive image frames of an image signal to determine a motion vector; and performing left-eye/right-eye image determination on a current image frame from the two consecutive image frames according to the motion vector.

According to another embodiment of the present disclosure, an image detecting apparatus comprises a calculating unit and a determining unit. The calculating unit performs block matching on a target area corresponding to two consecutive image frames of an image signal to determine a motion vector. The determining unit performs left-eye/right-eye image determination on a current image frame from the consecutive image frames according to the motion vector.

BRIEF DESCRIPTION OF THE DRAWINGS

FIG. 4A to FIG. 4C are schematic diagrams illustrating detection of an input image signal $Y_{in}$ with different frame rates by the image detecting apparatus in FIG. 1.

DETAILED DESCRIPTION OF THE PREFERRED EMBODIMENT

Figure 1:
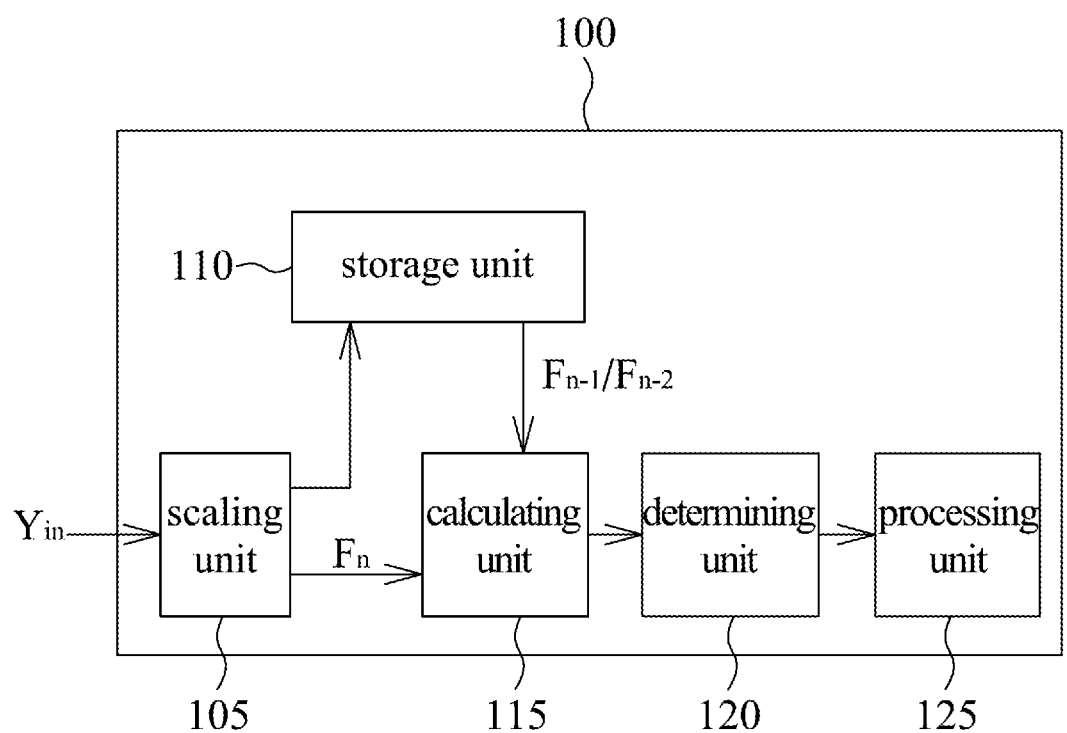
FIG. 1 is a block diagram of an image detecting apparatus in accordance with an embodiment of the present disclosure.

FIG. 1 shows a block diagram of an image detecting apparatus 100 in accordance with an embodiment of the present disclosure. The image detecting apparatus 100 comprises a scaling unit 105, a storage unit 110, a calculating unit 115, a determining unit 120, and a processing unit 125. The calculating unit 115 performs block matching on a target area corresponding to two consecutive image frames of an input image signal $Y_{in}$ to calculate a plurality of block matching differences, selects a relatively small block matching difference from the plurality of block matching differences, and determines a motion vector according to the relatively small block matching difference. In an embodiment, the relatively small block matching difference is the minimum block matching difference from the plurality of block matching differences. The determining unit 120 performs left-eye/right-eye image determination on a current image frame from the two consecutive image frames according to the motion vector to generate a determination result. The processing unit 125 compiles statistics of a plurality of determination results of a plurality of areas of the current image frame to determine a dimension of the current image frame, and to determine the current image frame as a left-eye image or a right-eye image. In addition, in this embodiment, in order to effectively reduce system calculation cost, image frames of the input image signal $Y_{in}$ are scaled down, by the scaling unit 105, to a plurality of down-scaled image frames before the calculating unit 115 performs block matching. After that, the calculating unit 115 performs block matching according to two consecutive down-scaled image frames to determine motion vectors. However, it is to be noted that, the scaling unit 105 and the storage unit 110, for respectively reducing the system calculation cost and temporary storing images, are not limitations of the present disclosure as they are not main components for performing left-eye/right-eye image determination.

More specifically, the scaling unit 105 scales down the image frames of the input image signal $Y_{in}$ by either horizontal scale down (HSD) or vertical scale down (VSD), so as to respectively generate down-scaled image frames, which are then written into the storage unit 110 and outputted to the calculating unit 115. For example, the scaling unit 105 scales down the image frames by sampling or averaging the image frames. The calculating unit 115 receives a down-scaled image frame transmitted from the scaling unit 105 and reads a down-scaled image frame from in the storage unit 110.

Since the calculating unit 115 almost simultaneously receives and reads the down-scaled image frames, as far as a time sequence is concerned, when the down-scaled frame received by the calculating unit 115 from the scaling unit 105 is a current image frame $F_n$, the down-scaled frame read by the calculating unit 115 from the storage unit 110 is a frame prior to the current image frame $F_n$, e.g., the previous image frame is $F_{n-1}$ or $F_{n-2}$. Therefore, the calculating unit 115 performs block matching on a target area corresponding to the current image frame $F_n$ and the previous image frame $F_{n-1}$ to calculate the block matching differences.

In this embodiment, the calculating unit 115 performs block matching in the horizontal direction due to visual angle characteristics of left-eye/right-eye images. More specifically, the calculating 115 first performs block matching on a plurality of image blocks of two consecutive image frames to generate a plurality of block matching values, and then adds up the plurality of block matching values to generate a corresponding block matching difference among the abovementioned plurality of block matching differences, all of which are then obtained by iterating the foregoing operations. For example, the plurality of image blocks are image blocks covered by each of scan line areas of the image frames, and the calculating unit 115 performs block matching on image blocks covered by corresponding scan line areas of the current image frame $F_n$ and the previous image frame $F_{n-1}$.

Figure 2:
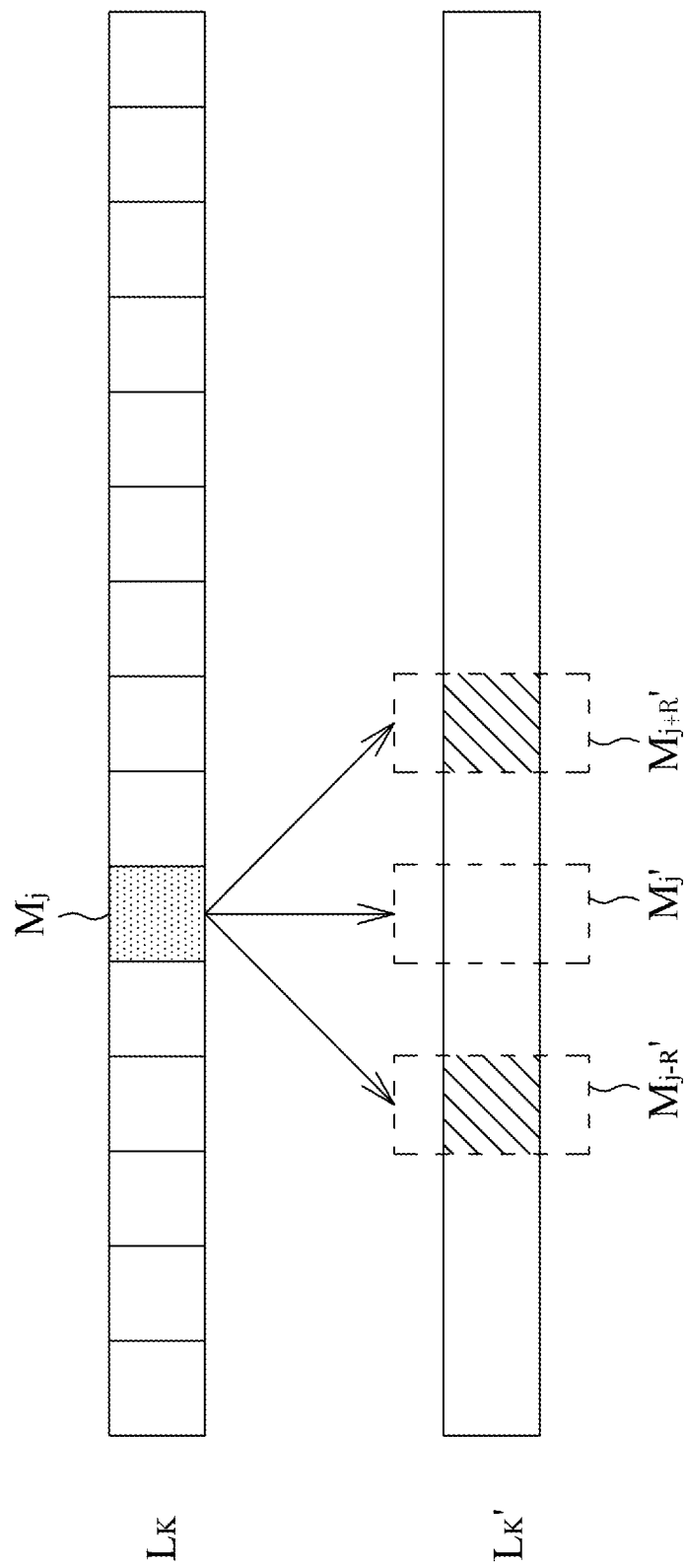
FIG. 2 is a schematic diagram illustrating operations of block matching by the image detecting apparatus in FIG. 1.

FIG. 2 shows a schematic diagram of operations of block matching by the image frame detecting apparatus 100 in FIG. 1. The calculating unit 115 performs block matching on an image block $M_j$ of a scan line area $L_k$ corresponding to the previous image frame $F_{n-1}$ and 2n+1 blocks $M_{j-R}'$ to $M_{j+R}'$ of a scan line area $L_k'$ corresponding to the current image frame $F_n$ to generate a plurality of block matching values (e.g., a sum of absolute differences (SAD) between pixel values), where k represents a kth scan line area, j represents a jth block in the horizontal direction, and the plurality of block matching values corresponding to different horizontal motion vectors. After that, the calculating unit 115 performs block matching on a different block (e.g., a block $M_{j+1}$) of the scan line area $L_k$ corresponding to the previous image frame $F_{n-1}$ and a plurality of blocks (e.g., blocks $M_{j-R+1}'$ to $M_{j+R+1}'$) of the scan line area $L_k'$ corresponding to the current image frame $F_n$ to generate a plurality of block matching values. Therefore, for every horizontal motion vector, the different image blocks of the scan line area $L_k$ corresponding to the previous image frame $F_{n-1}$ can generate a plurality of block matching values. More specifically, for the block $M_j$ of the previous image frame $F_{n-1}$, the calculating unit 115 calculates 2R+1 block matching values respectively corresponding to 2R+1 different horizontal motion vectors. Likewise, for the block $M_{j+1}$, the calculating unit 115 obtains other 2R+1 block matching values respectively corresponding to 2R+1 motion vectors via the foregoing operations. After iterating N times the foregoing operations, i.e., after block matching is performed on N different blocks of the scan line area $L_k$, every horizontal motion vector then corresponds to N block matching values (i.e., the SAD). For each of the horizontal motion vectors, e.g., a horizontal motion vector (1, 0) of a distance for moving rightwards by a block, the calculating unit 115 adds up N SADs corresponding to the motion vector (1, 0) to generate a block matching difference, and accordingly respectively generates a plurality of block matching differences corresponding to 2R+1 horizontal motion vectors. The minimum block matching difference is selected from the plurality of block matching differences, and a dimension of the current image frame $F_n$ is determined according to a motion vector corresponding to the minimum block matching difference, i.e., it is determined whether the current image frame $F_n$ is a stereo image or a plane image. For example, when the current image frame $F_n$ is a stereo image, it is further determined whether the current image frame $F_n$ is a left-eye image or a right-eye image according to a motion vector.

Figure 3A:
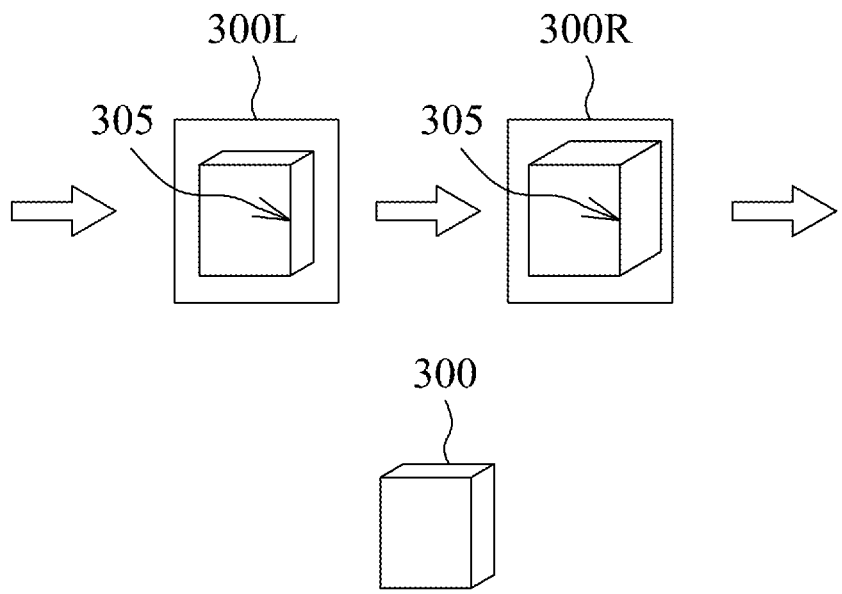
FIG. 3A and FIG. 3B are schematic diagrams of examples of left-eye/right-eye images having different sequences in an input image signal $Y_{in}$.
Figure 3B:
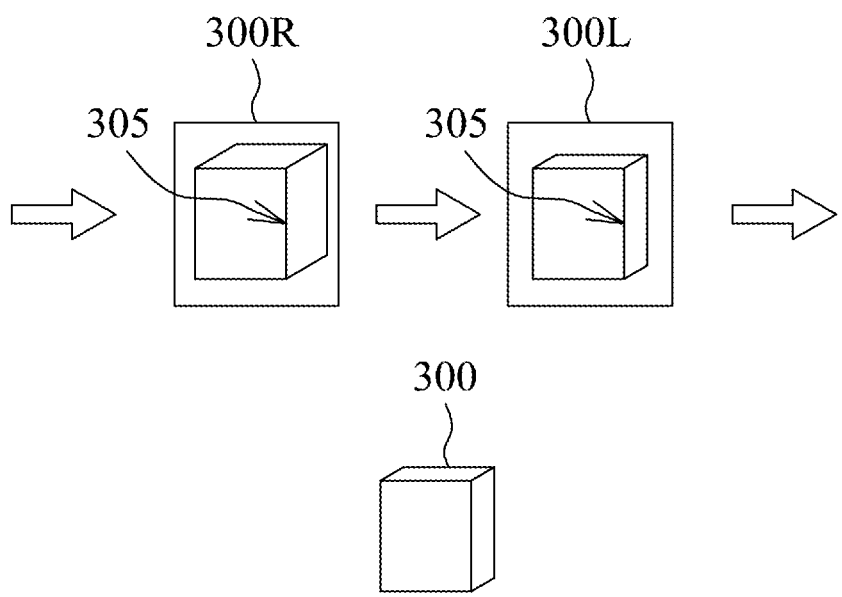

An associated principle for determining whether the current image frame is a right-eye image or a left-eye image is described below with reference to FIG. 3A and FIG. 3B. FIG. 3A and FIG. 3B respectively show schematic diagrams of examples of left-eye/right-eye images having different sequences in an input image signal $Y_{in}$. A current image frame received by the image detecting apparatus 100 is a right-eye image 300R of a stereo image 300 represented by cubes in FIG. 3A, and a previous image frame is a left-eye image 300L, i.e., the image detecting apparatus 100 first receives the left-eye image 300L and then receives the right-eye image 300R. For forming a stereo image, referring to FIG. 3A, since the left-eye image 300L has a left-inclined visual angle while the right-eye image 300R has a right-inclined visual angle, a same image may appear at different positions. For example, an edge 305 formed by the front plane and the side plane of the cube of the left-eye image 300L is more near the right side than it of the right-eye image 300R. Therefore, when a previous image frame is the left-eye image 300L and a current image frame is the right-eye image 300R, as generated by the calculating 115 from performing block matching, a motion vector corresponding to the cube edge 305 is directed rightwards; otherwise, when the previous image frame is the right-eye image 300R and the current image frame is the left-eye image 300L (as shown in FIG. 3B), as generated by the calculating 115 from performing block matching, the motion vector corresponding to the cube edge 305 is directed leftwards. Therefore, according to a direction of the motion vector, it can be determined that the current image frame is the left-eye image 300L or the right-eye image 300R, thereby determining that other stereo images are left-eye or right-eye images. In contrast, when the calculated motion vector is zero, it means that the images in the two consecutive image frames don't move, such that it is determined that the frames are 2D images but not stereo images. Accordingly, in this embodiment, besides determining a dimension of the current image frame, it is also determined whether the current image frame is a left-eye image or a right-eye image according to the calculated motion vector.

Operation details of the determining unit 120 are described below. When a motion vector corresponding to a minimum block matching difference generated by performing block matching on the scan line areas $L_k$ and $L_k'$ indicates a rightward horizontal direction, the determining unit 120 determines that the scan line area $L_k'$ of the current image frame $F_n$ is a right-eye image, and generates a determination result "1" according to the right-eye image. The determination result "1" is recorded in a flag corresponding to the scan line area $L_k'$ for subsequent statistics compiling by the processing unit 125. When the motion vector indicates a leftward horizontal direction, the determining unit 120 determines that the current image frame $F_n$ in the scan line area $L_k'$ is a left-eye image, and generates a determination result "2" to be recorded in the flag corresponding to the scan line area $L_k'$. In addition, when the motion vector does not indicate any direction, the determining unit 120 determines that the current image frame $F_n$ in scan line area $L_k'$ is neither the left-eye image nor the right-eye image but a 2D image, and generates a determination result "0" to be recorded in the flag corresponding to the scan line area $L_k'$. As mentioned above, the determining unit 120 determines the current image frame $F_n$ as the left-eye image or the right-eye image according to the motion vector calculated by the calculating unit 115 with respect to the scan line areas $L_k$ and $L_k'$. However, in order to more accurately determine whether the current image frame $F_n$ is the left-eye image or the right-eye image, in this embodiment, the calculating unit 115 respectively performs block matching on a plurality of scan line areas (to even all scan line areas) of the previous image frame $F_{n-1}$ and the current image frame $F_n$ to determine motion vectors corresponding to the scan line areas.

After the calculating unit 115 performs block matching on each of the scan line areas and the determining unit 120 performs left-eye/right-eye image determination on each of the scan line areas, a flag value corresponding to each of the scanning areas may indicate an image frame as a left-eye image, a right-eye image or a 2D image. When a determination result indicates that an image frame is a left-eye image, i.e., when a flag value is "2", the processing unit 125 increases a count value of a first counter; when the determination result indicates that the frame is a right-eye image, i.e., when the flag value is "1", the processing unit 125 increases a count value of a second counter. When the processing unit 125 compiles statistics of determination results (i.e., flag values) of the current image frame $F_n$ in all scan line areas, it is determined whether the current image frame $F_n$ is a left-eye image, a right-eye image or a 2D image according to the count values of the first counter and the second counter. More specifically, when a ratio of the count values of the first counter and the second counter is higher than a first threshold $V_{th1}$, the processing unit 125 determines that the current image frame $F_n$ is a left-eye image; when the ratio of the count values of the first counter and the second counter is lower than a second threshold $V_{th2}$, the processing unit 125 determines that the current image frame $F_n$ is a right-eye image, where the second threshold $V_{th2}$ is lower than the first threshold $V_{th1}$. In other words, when a majority of determination results of the current image frame $F_n$ in all scan line areas are left-eye images, the processing unit 125 determines the current image frame $F_n$ as the left-eye image; when a majority of determination results of the current image frame $F_n$ in all scan line areas are right-eye images, the processing unit 125 determines the current image frame $F_n$ as the right-eye image. When the ratio of the first counter and the second counter is between the first threshold $V_{th1}$ and the second threshold $V_{th2}$, the processing unit 125 determines the current image frame $F_n$ with reference to a determination result of another image frame (e.g., a previous image frame $F_{n-1}$ or a next frame $F_{n+1}$). In addition, when the count values of the first counter and the second counter are small (e.g., the count values are smaller than a predetermined value), it means that the current image frame $F_n$ is a 2D image. At this point, the processing unit 125 determines that the current image frame $F_n$ is a 2D image or a plane image to avoid mistakenly determining the plane image as a stereo image.

The description below is given with reference to FIG. 4A to FIG. 4C, which show schematic diagrams illustrating detection of an input image signal $Y_{in}$ with different frame rates by the image detecting apparatus in FIG. 1. Referring to FIG. 4A, the image detecting apparatus 100 detects the input image signal $Y_{in}$ with a date rate of 60 Hz. The input image signal $Y_{in}$ has a left-eye image L or a right-eye image R at one frame time point, and the image detecting apparatus 100 first receives the left-eye image L and then receives the right-eye image R in sequence. Accordingly, the calculating unit 115 is designed as determining whether the input image signal $Y_{in}$ comprises a motion image according to a plurality of image frames comprising a plurality of odd image frames or a plurality of even image frames (i.e., a plurality of left-eye images or a plurality of right-eye images). More specifically, the calculating unit 115 may determine whether the input image signal $Y_{in}$ comprises a motion image according to a plurality of odd image frames; likewise, the calculating unit 115 may determine whether the input image signal $Y_{in}$ comprises a motion image according to a plurality of even image frames. The processing unit 125 determines whether a current image frame is a left-eye image or a right-eye image according to a result of whether having the motion image and statistics of the foregoing determination results. For example, when the input image signal $Y_{in}$ in FIG. 4A comprises a motion image, the processing unit 125 performs left-eye/right-eye determination on two consecutive image frames at a same time point (e.g., a left-eye image L and a right-eye image R at a time point t1), but not on two consecutive image frames at two different time points (e.g., a right-eye image R and a left-eye image L at the time point t1), so as to prevent misjudgments. Referring to FIG. 4A, when a majority of flag values corresponding to frames (e.g., right-eye images R) determined at time points are recorded as "1", the processing unit 125 determines that the current image frame is a right-eye image R, and accordingly the previous image frame or the next frame is a left-eye image L. At this point, flag values of frames not processed at the time points are marked "X" for distinction. Therefore, even if the input image signal $Y_{in}$ comprises a motion image, the image detecting apparatus 100 still can effectively and accurately detect a sequence of left-eye/right-eye images of the input image signal $Y_{in}$. In another aspect, when the input image signal $Y_{in}$ does not comprise any motion image (i.e., the input image signal $Y_{in}$ only comprises static images), regardless of being at a same time point or at different time points, the processing unit 125 performs dimension determination or left-eye/right-eye image determination on two consecutive image frames. Accordingly, when the previous image frame and the current image frame are at a same time point (e.g., a left-eye image L and a right-eye image R are at the time point t1), the determining unit 120 determines that a majority of flag values corresponding to the current image frame are recorded as "1", and determines that the current image frame is a right-eye image R. On the contrary, when the previous image frame and the current image frame are at different time points (e.g., the right-eye image R is at the time point t1 and a left-eye image L is at a time point t2), the determining unit 120 determines that a majority of flag values corresponding to the current image frame are recorded as "2", and determines that the current image frame is a lift-eye image L. Accordingly, the image frame detecting apparatus 100 is capable of effectively detecting a sequence of left-eye/right-eye images of the input image signal $Y_{in}$.

Referring to FIG. 4B, the image detecting apparatus 100 first receives a right-eye image R of the input image signal $Y_{in}$ and then receives a left-eye image L. The processing unit 125 determines a dimensional of the current image frame according to a result of determining whether the input image signal $Y_{in}$ comprises a motion image, and statistics of the foregoing determination results.

In the embodiment in FIG. 4C, the input image signal $Y_{in}$ has a frame rate of 120 Hz, and each of left-eye images and each of right-eye images of the input image signal $Y_{in}$ correspond to different time points. The image detecting apparatus 100 first receives a left-eye image L and then receives a right-eye image R. The processing unit 125 determines a dimension of the input image signal $Y_{in}$ and a sequence of left-eye/right-eye images according to a result of determining whether the input image signal $Y_{in}$ comprises a motion image and statistics of the foregoing determination results. For example, when a motion image is detected in an image frame of the input image signal $Y_{in}$, the processing unit 125 performs neither the dimension determination nor the sequence determination of left-eye/right-eye images to prevent misjudgments. On the contrary, when the input image signal $Y_{in}$ does not comprise any motion image, the processing unit 125 performs the dimension determination or the sequence determination of left-eye/right-eye images on two consecutive image frames.

Figure 5:
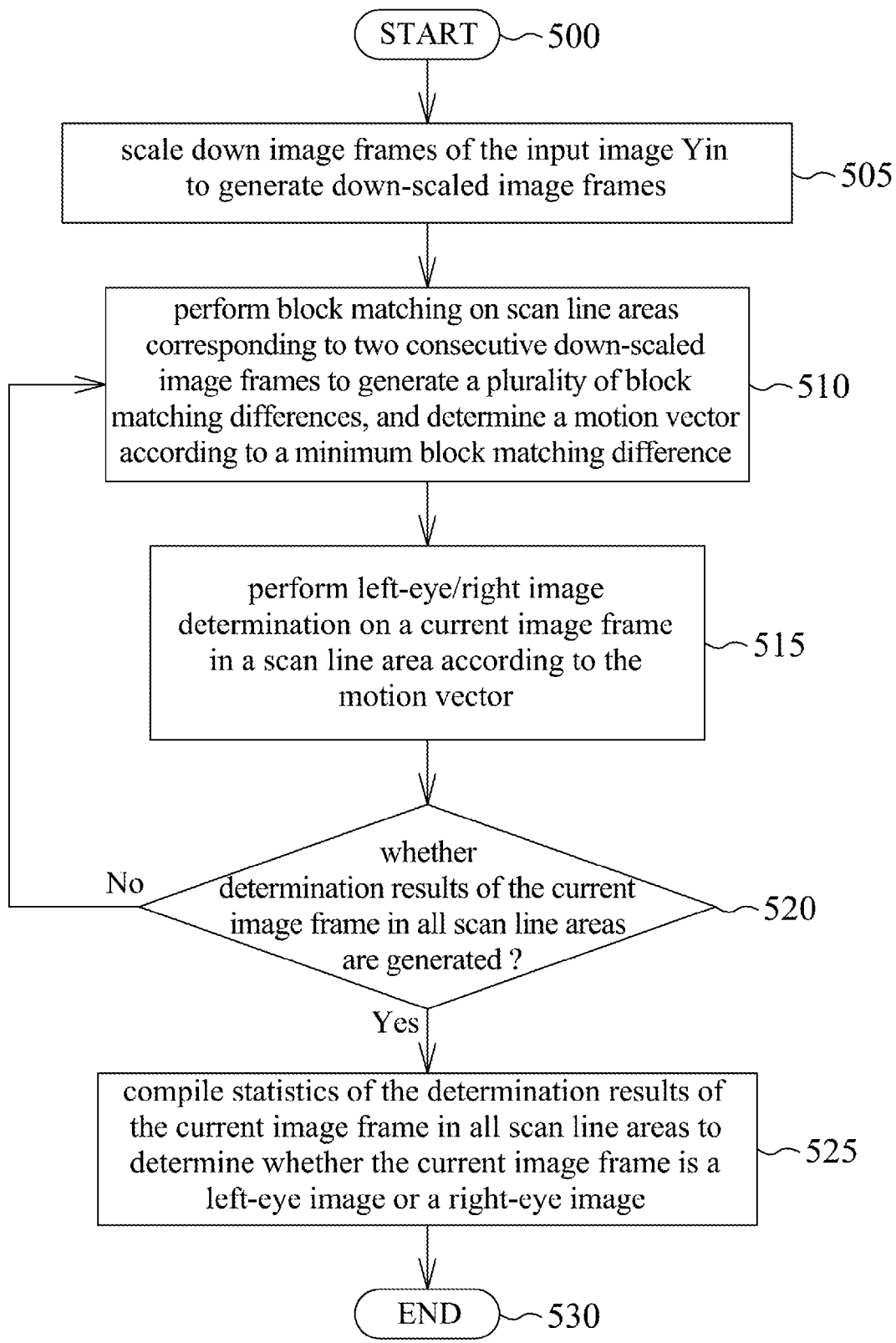
FIG. 5 is a flow chart of operations of the image detecting apparatus in FIG. 1.

FIG. 5 shows a flow chart of operations of the image detecting apparatus 100 in FIG. 1. Note that on a premise that the same effect is achieved in practice, the steps of operations of the present image detecting method need not be executed as the sequence shown in FIG. 5, and can be interleaved with other steps of the same flow.

The flow begins with Step 500. In Step 505, the scaling unit 105 scales down image frames of the input image signal $Y_{in}$ to generate down-scaled image frames. In Step 510, the calculating unit 115 performs block matching on scan line areas corresponding to two consecutive down-scaled image frames to generate a plurality of block matching differences, and selects the minimum block matching difference from the plurality of block matching differences to determine a motion vector. In Step 515, the determining unit 120 performs left-eye/right image determination on a current image frame in a scan line area according to the motion vector corresponding to the minimum block matching difference to generate a determination result. In Step 520, it is determined whether determination results of the current image frame in all scan line areas are generated. When the result of Step 520 is positive, Step 525 is performed; otherwise, Step 510 is performed. In Step 525, the processing unit 125 compiles statistics of the determination results of the current image frame in all scan line areas to determine whether the current image frame is a left-eye image or a right-eye image. The flow ends in Step 530.

In an embodiment, the calculating unit 115 can perform block matching on image blocks within a plurality of corresponding areas in other sizes, e.g., block matching is performed on image blocks within a range of a square area but not only the image blocks in the scan line areas. In addition, in order to rapidly calculate the plurality of block matching differences, the calculating unit 115 can select a representative image block from the plurality of corresponding areas, and respectively calculates a plurality of block matching values as the plurality of block matching differences according to the representative image block and a plurality of different horizontal motion vectors. Referring to FIG. 2, for example, the calculating unit 115 selects the block $M_j$ in the scan line area $L_k$ corresponding to the previous image frame $F_{n-1}$ as a representative image block to perform block matching on the block $M_j$ and the blocks $M_{j-R}'$ to $M_{j+R}'$ in the scan line area $L_k'$ corresponding to the current image frame $F_n$, so as to generate a plurality of SADs as a plurality of block matching differences, i.e., a minimum SAD from the SADs serves as a minimum block matching difference to be provided to the subsequent determining unit 120 to determine whether the current image frame $F_n$ in the scan line area $L_k'$ is a right-eye image, a left-eye image, or a plane image. In other words, the calculating unit 115 need not perform block matching on all image blocks within the plurality of corresponding areas. In other embodiment, in order to improve efficiency of system calculation, certain image blocks are omitted while block matching is performed on certain representative image blocks, and such modifications are within the spirit and scope of the present disclosure.

Figure 6:
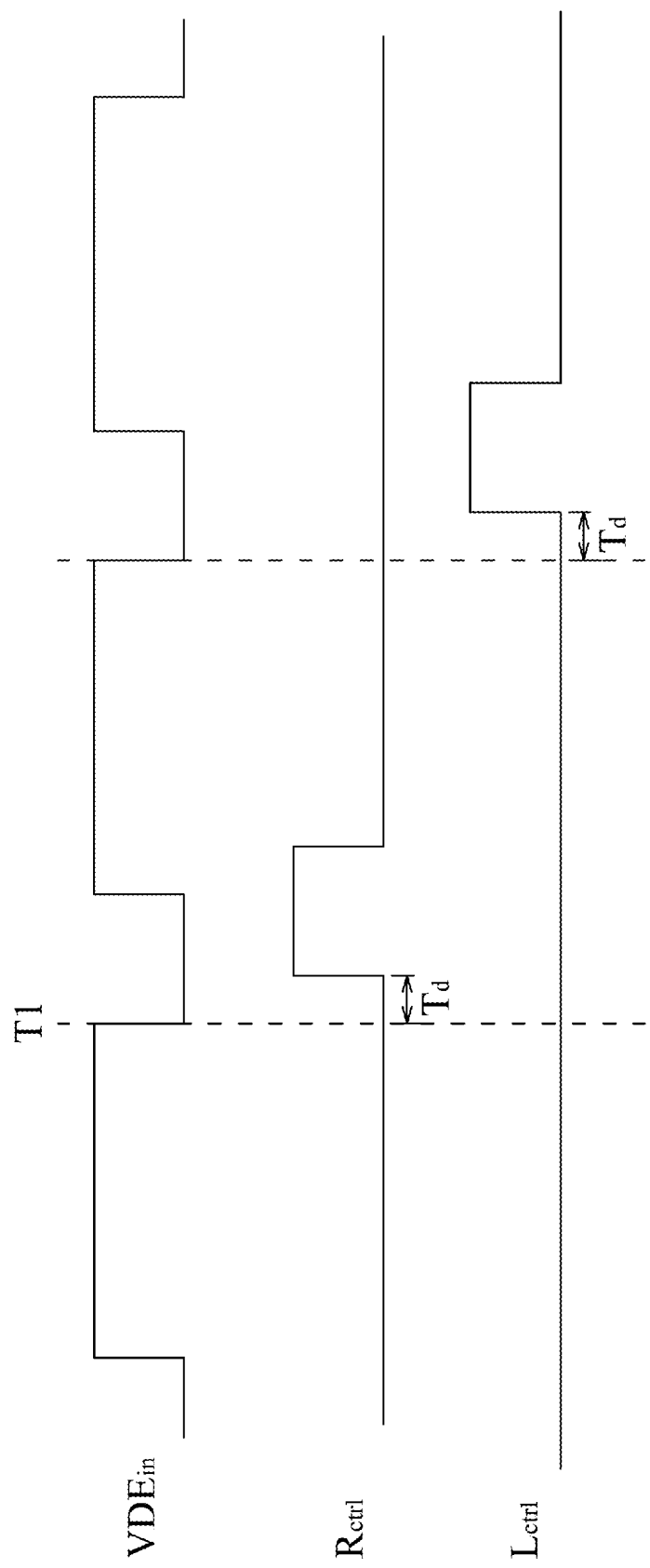
FIG. 6 is a timing diagram of a stereo glass control signal generated by a processing unit in FIG. 1.

In one embodiment, the processing unit 125 of the image detecting apparatus 100 further generates a stereo glass control signal according to a determination result of a sequence of left-eye/right-eye images. FIG. 6 shows a timing diagram of a stereo glass control signal generated by the processing unit 125. An initial vertical data enable signal $VDE_{in}$ of an input image signal $Y_{in}$ has a periodically high logic level. A rising edge of the high logic level represents a start time point of a left-eye image or a right-eye image, and a falling edge of the high logic level represents an end time point of a left-eye image or a right-eye image. For example, the time T1 represents a time point of practically completing scanning a right-eye image. However, since the image detecting apparatus 100 performs left-eye/right-eye image determination on the input image signal $Y_{in}$, in a practical situation, an overall time delay (e.g., a time difference $T_d$) may already be resulted in the original input image signal $Y_{in}$ when it is determined that a current image frame is a left-eye/right-eye image and an image data is outputted. Therefore, apart from determining a sequence of left-eye/right-eye images of the input image signal $Y_{in}$, the processing unit 125 also estimates the time delay $T_d$, of the input image signal $Y_{in}$, resulted by the image detecting apparatus 100. The processing unit 125 generates a stereo glass control signal $R_{ctrl}$ of a right-eye image and a stereo glass control signal $L_{ctrl}$ of a left-eye image with reference to the original vertical data enable signal $VDE_{in}$ and operation delays resulted by all of the units. For that the most part of overall efficiency of the image detecting apparatus 100 is determined according to the block matching performed by the calculating unit 115, the processing unit 125 generates the stereo glass control signal $R_{ctrl}$ of the right-eye image and the stereo glass control signal $L_{ctrl}$ of the left-eye image only with reference to the original vertical data enable signal $VDE_{in}$ and a delay resulted by the block matching performed by the calculating unit 115—such principle is also within the spirit and scope of the present disclosure.

While the present disclosure has been described in terms of what is presently considered to be the most practical and preferred embodiments, it is to be understood that the disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image detecting method, for determining a sequence of left-eye and right-eye image frames of an image signal, comprising:
 (a) performing block matching on a target area corresponding to two consecutive image frames of the image signal to determine a motion vector;
 (b) determining a current image frame from the two consecutive image frames as a left-eye image or a right-eye image according to the motion vector;
 (c) generating a stereo glass control signal according to a synchronous signal of the image signal and a result of the left-eye/right-eye image determination in (b);
 (d) respectively performing the step (a) and step (b) on a plurality of areas corresponding to the two consecutive image frames to generate a first plurality of determination results; and
 (e) compiling statistics of the first plurality of the determination results of the current image frame to determine the current image frame as a left-eye image or a right-eye image, wherein step (e) comprises increasing a first count value for each of the first plurality of determination results which indicates the left-eye image.

2. The method as claimed in claim 1, wherein the step (a) comprises:
performing block matching on the target area corresponding to the two consecutive image frames to generate a plurality of block matching differences; and
determining the motion vector according to a relatively small block matching difference from the plurality of block matching differences.

3. The method as claimed in claim 2, wherein the relatively small block matching difference is a minimum block matching difference from the plurality of block matching differences.

4. The method as claimed in claim 1, wherein in the step (a), the block matching is performed in a horizontal direction.

5. The method as claimed in claim 1, wherein the two consecutive image frames correspond to a same time point.

6. The method as claimed in claim 1, wherein the step (e) comprises:
calculating a number of a second plurality of determination results that indicate the current image frame as a left-eye image to generate the first count value;
calculating a number of a third plurality of determination results that indicate the current image frame as a right-eye image to generate a second count value; and
determining the current image frame as the left-eye image or the right-eye image according to the first count value and the second count value.

7. The method as claimed in claim 6, wherein when the first count value and the second count value are smaller than a predetermined value, the current image frame is determined to be a two-dimensional (2D) image.

8. The method as claimed in claim 1, before the step (a) is carried out, further comprising:
scaling down the two consecutive image frames to generate two consecutive down-scaled image frames;
wherein, in the step (a), the block matching is performed on the two consecutive down-scaled image frames.

9. The method as claimed in claim 1, further comprising:
determining whether two inconsecutive image frames of the image signal comprise a motion image; and
omitting a result of the left-eye/right-eye image determination of the step (b) when the two inconsecutive image frames of the image signal comprise the motion image.

10. An image detecting apparatus, for determining a sequence of left-eye and right-eye image frames of an image signal, comprising:
a calculating unit that performs block matching on a target area corresponding to two consecutive image frames of the image signal to determine a motion vector, wherein the calculating unit respectively performs block matching on a plurality of areas of the two consecutive image frames to determine a plurality of motion vectors;
a determining unit that determines a current image frame from the two consecutive image frames as a left-eye image or a right-eye image according to the motion vector, wherein the determining unit respectively performs left-eye/right-eye image determination on the current image frame according to the plurality of motion vectors to generate a first plurality of determination results; and
a processing unit that compiles statistics of the first plurality of the determination results of the current image frame to determine the current image frame as a left-eye image or a right-eye image, wherein the processing unit generates a stereo glass control signal according to a synchronous signal of the image signal and the determination of the processing unit, wherein the processing unit increases a first count value of a first counter for each of the first plurality of determination results which indicates the left-eye image.

11. The apparatus as claimed in claim 10, wherein the calculating unit selects a representative image block from the target area, performs block matching according to the representative image block and a plurality of image blocks corresponding to a plurality of horizontal motion vectors to generate a plurality of block matching differences, and determines the motion vector according to the block matching differences.

12. The apparatus as claimed in claim 10, wherein the two consecutive image frames correspond to a same time point.

13. The apparatus as claimed in claim 10, wherein the processing unit calculates a second plurality of determination results that indicate the current image frame as a left-eye image and a third plurality of determination results that indicate the current image frame as a right-eye image to respectively generate the first count value and a second count value, and determines the current image frame as the left-eye image or the right-eye image according to the first count value and the second count value.

14. The apparatus as claimed in claim 13, wherein when the first count value and the second count value are smaller than a predetermined value, the processing unit determines the current image frame as a 2D image.

15. The apparatus as claimed in claim 10, further comprising:
a scaling unit that scales down the two consecutive frames to generate two consecutive down-scaled image frames;
wherein, the calculating unit performs block matching on the two consecutive down-scaled image frames.

16. An image detecting apparatus, for determining a sequence of left-eye and right-eye image frames of an image signal, comprising:
a calculating unit that performs block matching on a target area corresponding to two consecutive image frames of the image signal to determine a motion vector, wherein the calculating unit respectively performs block matching on a plurality of areas of the two consecutive image frames to determine a plurality of motion vectors;
a determining unit that determines a current image frame from the two consecutive image frames as a left-eye image or a right-eye image according to the motion vector, wherein the determining unit respectively performs left-eye/right-eye image determination on the current image frame according to the plurality of motion vectors to generate a first plurality of determination results; and
a processing unit that compiles statistics of the first plurality of the determination results of the current image frame to determine the current image frame as a left-eye image or a right-eye image, wherein the processing unit generates a stereo glass control signal according to a synchronous signal of the image signal and the determination of the processing unit, wherein the processing unit increases a count value for each of the first plurality of determination results which indicates the right-eye image.

* * * * *